(12) United States Patent
La et al.

(10) Patent No.: US 8,545,776 B2
(45) Date of Patent: Oct. 1, 2013

(54) REDUCING ALUMINOSILICATE SCALE IN THE BAYER PROCESS

(75) Inventors: Timothy La, Kardinya (AU); Ji Cui, Aurora, IL (US); John D. Kildea, Baldivis (AU); David H. Slinkman, Lombard, IL (US)

(73) Assignee: Nalco Company, Naperville, IL (US)

( * ) Notice: Subject to any disclaimer, the term of this patent is extended or adjusted under 35 U.S.C. 154(b) by 346 days.

(21) Appl. No.: 12/567,116

(22) Filed: Sep. 25, 2009

(65) Prior Publication Data

US 2011/0076209 A1    Mar. 31, 2011

(51) Int. Cl.
| | |
|---|---|
| *C01F 7/04* | (2006.01) |
| *C01F 1/00* | (2006.01) |
| *C02F 1/52* | (2006.01) |
| *C02F 5/08* | (2006.01) |
| *B01D 21/01* | (2006.01) |

(52) U.S. Cl.
USPC ........ 423/121; 423/625; 423/118.1; 423/122; 423/127; 210/702; 210/705; 210/723

(58) Field of Classification Search
None
See application file for complete search history.

(56) References Cited

U.S. PATENT DOCUMENTS

| | | | |
|---|---|---|---|
| 5,118,484 | A | 6/1992 | The et al. |
| 5,314,626 | A | 5/1994 | Dimas |
| 5,415,782 | A | 5/1995 | Dimas |
| 5,650,072 | A | 7/1997 | Mc Clain et al. |
| 6,086,771 | A | 7/2000 | Selvarajan |
| 6,569,908 | B2 | 5/2003 | Noguchi et al. |
| 6,808,768 | B2 | 10/2004 | Satou et al. |
| 6,814,873 | B2 * | 11/2004 | Spitzer et al. ............ 210/698 |
| 6,867,318 | B1 * | 3/2005 | Cui ........................ 556/423 |
| 2004/0011744 | A1 | 1/2004 | Spitzer et al. |
| 2004/0162406 | A1 | 8/2004 | Spitzer |
| 2005/0010008 | A2 | 1/2005 | Spitzer et al. |
| 2005/0231436 | A1 | 10/2005 | McLean et al. |
| 2007/0178041 | A1 | 8/2007 | Tizon et al. |
| 2007/0231249 | A1 | 10/2007 | Batllo et al. |
| 2009/0008335 | A1 | 1/2009 | Flocken et al. |
| 2009/0026064 | A1 | 1/2009 | McCausland |

FOREIGN PATENT DOCUMENTS

| | | |
|---|---|---|
| WO | WO 9600643 A1 | 2/1996 |
| WO | WO 97/41065 | 11/1997 |
| WO | WO 97/41075 | 11/1997 |
| WO | WO 2006/003470 A1 | 1/2006 |
| WO | WO 2008/045677 A1 | 4/2008 |

OTHER PUBLICATIONS

Product Silica Control Options, by B. J. Robson, p. 87, *Light Metals* (1998).
A Novel Approach to Post-Desilicating Bayer Process Liquor, by K. I. The, p. 117, *Light Metals* (1998).
Max HT Sodalite Scale Inhibitor: Plant Experience and Impact on the Process, by Donald Spitzer et al., pp. 57-62, *Light Metals 2008* (2008).
*Performance Appraisal of Evaporation System with Scale Inhibitor Application in Alnorte Plant*, by A. Oliveir.
International Search Report for PCT/US2010/049555 (corresponding PCT application).
International Search Report for PCT/2012/024099 (child PCT application).

* cited by examiner

*Primary Examiner* — Steven Bos
*Assistant Examiner* — Justin Bova
(74) *Attorney, Agent, or Firm* — Benjamin E. Carlsen; Calfee, Halter & Griswold LLP

(57) ABSTRACT

The invention provides a method of inhibiting the accumulation of DSP scale in the liquor circuit of Bayer process equipment. The method includes adding one or more particular silane based small molecules to the liquor fluid circuit. These scale inhibitors reduce DSP scale formation and thereby increase fluid throughput, increase the amount of time Bayer process equipment can be operational and reduce the need for expensive and dangerous acid washes of Bayer process equipment. As a result, the invention provides a significant reduction in the total cost of operating a Bayer process.

10 Claims, No Drawings

REDUCING ALUMINOSILICATE SCALE IN THE BAYER PROCESS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to compositions of matter and methods of using them to treat scale in various industrial process streams, in particular certain silane based small molecules that have been found to be particularly effective in treating aluminosilicate scale in a Bayer process stream.

As described among other places in U.S. Pat. No. 6,814,873 the contents of which are incorporated by reference in their entirety, the Bayer process is used to manufacture alumina from Bauxite ore. The process uses caustic solution to extract soluble alumina values from the bauxite. After dissolution of the alumina values from the bauxite and removal of insoluble waste material from the process stream the soluble alumina is precipitated as solid alumina trihydrate. The remaining caustic solution known as "liquor" and/or "spent liquor" is then recycled back to earlier stages in the process and is used to treat fresh bauxite. It thus forms a fluid circuit. For the purposes of this application, this description defines the term "liquor". The recycling of liquor within the fluid circuit however has its own complexities.

Bauxite often contains silica in various forms and amounts. Some of the silica is unreactive so it does not dissolve and remains as solid material within the Bayer circuit. Other forms of silica (for example clays) are reactive and dissolve in caustic when added into Bayer process liquors, thus increasing the silica concentration in the liquor. As liquor flows repeatedly through the circuit of the Bayer process, the concentration of silica in the liquor further increases, eventually to a point where it reacts with aluminum and soda to form insoluble aluminosilicate particles. Aluminosilicate solid is observed in at least two forms, sodalite and cancrinite. These and other forms of aluminosilicate are commonly referred to, and for the purposes of this application define, the terms "desilication product" or "DSP".

DSP can have a formula of $3(Na_2O.Al_2O_3.2SiO_2.0-2H_2O)$. $2NaX$ where X represents $OH^-$, $Cl^-$, $CO_3^{2-}$, $SO_4^{2-}$. Because DSP has an inverse solubility (precipitation increases at higher temperatures) and it can precipitate as fine scales of hard insoluble crystalline solids, its accumulation in Bayer process equipment is problematic. As DSP accumulates in Bayer process pipes, vessels, heat transfer equipment, and other process equipment, it forms flow bottlenecks and obstructions and can adversely affect liquor throughput. In addition because of its thermal conductivity properties, DSP scales on heat exchanger surfaces reduce the efficiency of heat exchangers.

These adverse effects are typically managed through a descaling regime, which involves process equipment being taken off line and the scale being physically or chemically treated and removed. A consequence of this type of regime is significant and regular periods of down-time for critical equipment. Additionally as part of the descaling process the use of hazardous concentrated acids such as sulfuric acid are often employed and this constitutes an undesirable safety hazard.

Another way Bayer process operators manage the buildup of silica concentration in the liquor is to deliberately precipitate DSP as free crystals rather than as scale. Typically a "desilication" step in the Bayer process is used to reduce the concentration of silica in solution by precipitation of silica as DSP, as a free precipitate. While such desilication reduces the overall silica concentration within the liquor, total elimination of all silica from solution is impractical and changing process conditions within various parts of the circuit (for example within heat exchangers) can lead to changes in the solubility of DSP, resulting in consequent precipitation as scale.

Previous attempts at controlling and/or reducing DSP scale in the Bayer process have included adding polymer materials containing three alkyloxy groups bonded to one silicon atom as described in U.S. Pat. No. 6,814,873 B2, US published applications 2004/0162406 A1, 2004/0011744 A1, 2005/0010008 A2, international published application WO 2008/045677 A1, and published article *Max HT™ Sodalite Scale Inhibitor: Plant Experience and Impact on the Process*, by Donald Spitzer et. al., Pages 57-62, *Light Metals* 2008, (2008) all of whose contents are incorporated by reference in their entirety.

Manufacturing and use of these trialkoxysilane—grafted polymers however can involve unwanted degrees of viscosity, making handling and dispersion of the polymer through the Bayer process liquor problematic. Other previous attempts to address foulant buildup are described in U.S. Pat. Nos. 5,650,072 and 5,314,626 both of which are incorporated by reference in their entirety.

Thus while a range of methods are available to Bayer process operators to manage and control DSP scale formation, there is a clear need for, and utility in, an improved method of preventing or reducing DSP scale formation on Bayer process equipment. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment is directed towards a method for reducing siliceous scale in a Bayer process comprising the step of adding to a Bayer liquor an aluminosilicate scale inhibiting amount of reaction product between an amine-containing molecule and an amine-reactive molecule containing at least one amine-reactive group per molecule and at least one —$Si(OR)_n$ group per molecule, where n=1, 2, or 3, and R=H, C1-C12 alkyl, aryl, Na, K, Li, or $NH_4$, or a mixture of such reaction products.

Another embodiment is directed towards a method for reducing siliceous scale in a Bayer process comprising the step of adding to a Bayer liquor an efficacious amount of reaction product between: 1) an amine-containing small molecule, and 2) an amine-reactive small molecule containing at least one amine-reactive group per molecule and at least one —$Si(OR)_n$ group per molecule, where n=1, 2, or 3, and R=H, C1-C12 alkyl, aryl, Na, K, Li, or $NH_4$, or a mixture of such reaction products, and 3) a non-polymeric amine reactive hydrophobic hydrocarbon.

At least one embodiment is directed towards a method of reducing DSP in a Bayer process comprising the step of adding to the Bayer process stream an aluminosilicate scale inhibiting amount of a mixture of products as defined above.

DETAILED DESCRIPTION OF THE INVENTION

For purposes of this application the definition of these terms is as follows:

"Polymer" means a chemical compound comprising essentially repeating structural units each containing two or more atoms. While many polymers have large molecular weights of greater than 500, some polymers such as polyethylene can have molecular weights of less than 500. Polymer includes copolymers and homo polymers.

"Small molecule" means a chemical compound comprising essentially non-repeating structural units. Because an oligomer (with more than 10 repeating units) and a polymer are essentially comprised of repeating structural units, they are not small molecules. Small molecules can have molecular weights above and below 500. The terms "small molecule" and "polymer" are mutually exclusive.

"Foulant" means a material deposit that accumulates on equipment during the operation of a manufacturing and/or chemical process which may be unwanted and which may impair the cost and/or efficiency of the process. DSP is a type of foulant.

"Amine" means a molecule containing one or more nitrogen atoms and having at least one secondary amine or primary amine group. By this definition, monoamines such as dodecylamine, diamines such as hexanediamine, and triamines such as diethylenetriamine, are all amines.

"GPS" is 3-glycidoxypropyltrimethoxysilane.

"Alkyloxy" means having the structure of OX where X is a hydrocarbon and O is oxygen. It can also be used interchangeably with the term "alkoxy". Typically in this application, the oxygen is bonded both to the X group as well as to a silicon atom of the small molecule. When X is $C_1$ the alkyloxy group consists of a methyl group bonded to the oxygen atom. When X is $C_2$ the alkyloxy group consists of an ethyl group bonded to the oxygen atom. When X is $C_3$ the alkyloxy group consists of a propyl group bonded to the oxygen atom. When X is $C_4$ the alkyloxy group consists of a butyl group bonded to the oxygen atom. When X is $C_5$ the alkyloxy group consists of a pentyl group bonded to the oxygen atom. When X is $C_6$ the alkyloxy group consists of a hexyl group bonded to the oxygen atom.

"Monoalkyloxy" means that attached to a silicon atom is one alkyloxy group.

"Dialkyloxy" means that attached to a silicon atom are two alkyloxy groups.

"Trialkyloxy" means that attached to a silicon atom are three alkyloxy groups.

"Synthetic Liquor" or "Synthetic Spent Liquor" is a laboratory created liquid used for experimentation whose composition in respect to alumina, soda, and caustic corresponds with the liquor produced by recycling through the Bayer process.

"Bayer Liquor" is actual liquor that has run through a Bayer process in an industrial facility.

In the event that the above definitions or a definition stated elsewhere in this application is inconsistent with a meaning (explicit or implicit) which is commonly used, in a dictionary, or stated in a source incorporated by reference into this application, the application and the claim terms in particular are understood to be construed according to the definition in this application, and not according to the common definition, dictionary definition, or the definition that was incorporated by reference.

In the Bayer process for manufacturing alumina, bauxite ore passes through a grinding stage and alumina, together with some impurities including silica, are dissolved in added liquor. The mixture then typically passes through a desilication stage where silica is deliberately precipitated as DSP to reduce the amount of silica in solution. The slurry is passed on to a digestion stage where any remaining reactive silica dissolves, thus again increasing the concentration of silica in solution which may subsequently form more DSP as the process temperature increases. The liquor is later separated from undissolved solids, and alumina is recovered by precipitation as gibbsite. The spent liquor completes its circuit as it passes through a heat exchanger and back into the grinding stage. DSP scale accumulates throughout the Bayer process but particularly at the digestion stage and most particularly at or near the heat exchanger, where the recycled liquor passes through.

In this invention, it was discovered that dosing of various types of silane-based products can reduce the amount of DSP scale formed.

In at least one embodiment of the invention, an effective concentration of a silane-based small molecule product is added to some point or stage in the liquor circuit of the Bayer process, which minimizes or prevents the accumulation of DSP on vessels or equipment along the liquor circuit.

In at least one embodiment, the small molecule comprises the reaction product between an amine and at least one amine-reactive silane, the silicon of the silane can be monoalkyloxy, dialkyloxy, trialkyloxy or trihydroxy.

In at least one embodiment the small molecule is a reaction product between an amine-containing small molecule and an amine-reactive molecule containing at least one amine-reactive group per molecule and at least one —$Si(OR)_n$ group per molecule, where n=1, 2, or 3, and R=H, C1-C12 alkyl, aryl, Na, K, Li, or $NH_4$, or a mixture of such reaction products.

In at least one embodiment, the amine molecule is selected from a linear or branched, aliphatic or cycloaliphatic monoamines or diamines. The total number of carbon atoms in the amine is preferred to be less than 30 and more preferred to be less than 20. In at least one embodiment the amine is selected from a list consisting of: isophoronediamine, xylenediamine, bis(aminomethyl)cyclohexane, hexanediamine, C,C,C-trimethylhexanediamine, methylene bis(aminocyclohexane), saturated fatty amines, unsaturated fatty amines such as oleylamine and soyamine, N-fatty-1,3-propanediamine such as cocoalkylpropanediamine, oleylpropanediamine, dodecylpropanediamine, hydrogenized tallowalkylpropanediamine, and tallowalkylpropanediamine and any combination thereof.

In at least one embodiment, a particularly effective small molecule comprises the reaction product of an amine small molecule together with 3-glycidoxypropyltrialkoxysilane (GPS).

In at least one embodiment the added small molecule is TG14. For the purposes of this application, the definition of TG14 is a small molecule having the structure of:

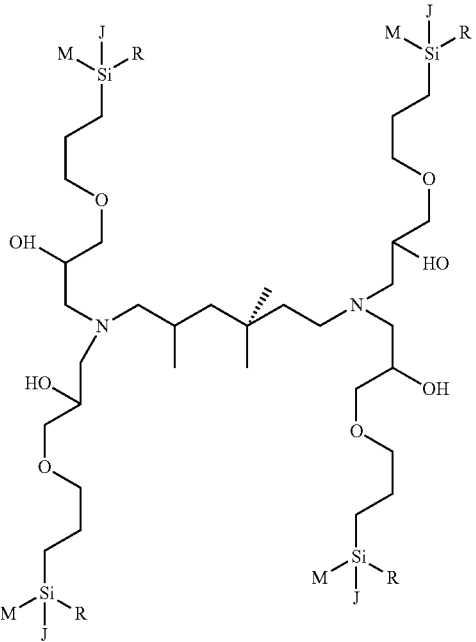

where the M, J, and R groups are each one selected from the list consisting of $C_1$-$C_6$ alkyloxy, hydrogen, hydroxide, or $C_1$-$C_6$ alkyl groups. M, J, and R can each be different or can be the same as some or all of the other groups. One form of TG14 is TG14-R, which is described in U.S. Pat. No. 6,867, 318. In TG14-R the M, J, and R groups are all the same $C_1$-$C_6$ alkyloxy group.

In at least one embodiment the small molecule is a monoalkyloxy TG14. In at least one embodiment the small molecule is a dialkyloxy TG14. In at least one embodiment the small molecule is a trialkyloxy TG14. In at least one embodiment the small molecule is a trihydroxy TG14.

In at least one embodiment the added small molecule is DG12. DG12 is a dodecylamine with one or more silane groups having one, two, or three alkyloxy groups on each silane group. For purposes of this application, the definition of DG12 is a small molecule having the structure of:

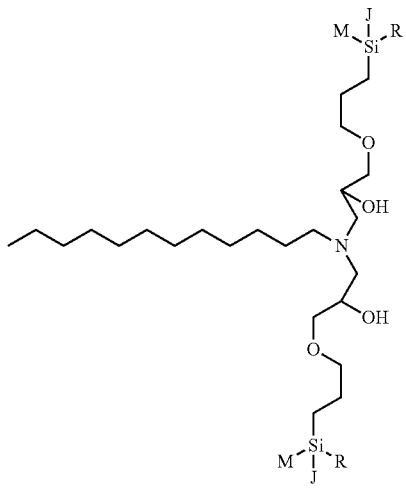

where the M, J, and R groups are each one selected from the list consisting of $C_1$-$C_6$ alkyloxy, hydrogen, hydroxide, or $C_1$-$C_6$ alkyl groups. M, J, and R can each be different or can be the same as some or all of the other groups. One form of DG12 is DG12-R, which is a trialkyloxy small molecule.

In at least one embodiment the small molecule is a monoalkyloxy DG12. In at least one embodiment the small molecule is a dialkyloxy DG12. In at least one embodiment the small molecule is a trialkyloxy DG12. In at least one embodiment the small molecule is a trihydroxy DG12.

The small molecule can also be selected from the list consisting of mono, di, tri or tetramine-epoxy functional silane adduct, mono, di, tri or tetramine-isocyanato functional silane adduct, TG14, DG12, any reaction product between a small molecule amine and an amine-reactive functional silane, and any combination thereof.

In at least one embodiment the small molecule is a reaction product between 1) an amine-containing small molecule, 2) an amine-reactive molecule containing one amine-reactive group per molecule and at least one —Si(OR)$_n$ group per molecule, where n=1, 2, or 3, and R=H, C1-C12 alkyl, aryl, Na, K, Li, or NH$_4$, or a mixture of such reaction products, together with 3) an amine reactive hydrophobic molecule.

In at least one embodiment, an amine small molecule is reacted with both 3-glycidoxypropyltrialkoxysilane (GPS) and a hydrophobic molecule to form a DSP inhibition composition. The hydrophobic molecule is an amine-reactive compound having an amine-reactive functional group such as glycidyl, chloro, bromo, or isocyanato groups. Besides the amine-reactive group, the hydrophobic molecule has at least one $C_3$-$C_{22}$ hydrophobic carbon chain, aromatic or aliphatic, linear or branched. A particularly effective hydrophobic molecule is 2-ethylhexyl glycidyl ether (E) the structure of which is shown below:

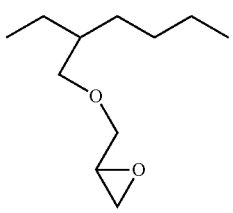

Other representative hydrophobic molecules are nonylphenol glycidylethers, which are described in International Patent Application WO 08045677A1.

In at least one embodiment, the amine molecule is selected from linear or branched, aliphatic or cycloaliphatic monoamines or diamines. The total number of carbon atoms in the amine is preferred to be less than 30 and more preferred to be less than 20.

In at least one embodiment the amine is selected from a list consisting of: isophoronediamine, xylenediamine, bis(aminomethyl)cyclohexane, hexanediamine, C,C,C-trimethylhexanediamine, methylene bis(aminocyclohexane), saturated fatty amines, unsaturated fatty amines such as oleylamine and soyamine, N-fatty-1,3-propanediamine such as cocoalkylpropanediamine, oleylpropanediamine, dodecylpropanediamine, hydrogenized tallowalkylpropanediamine, and tallowalkylpropanediamine and any combination thereof.

In at least one embodiment the amine is isophoronediamine (A) whose structure is:

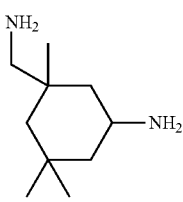

When isophoronediamine is reacted with 3-glycidoxypropyltrialkoxysilane and 2-ethylhexylglycidyl ether at 1:1:1 molar ratio, the resulting inhibition composition is primarily made of a molecule that has an isophoronediamine backbone with a single silane unit and a single hydrophobic unit.

Two representative structures of such amine-silane-hydrophobe adducts are shown below where the amine containing molecules are hexanediamine and isophoronediamine respectively, and wherein M, J, and R groups are each one independently selected from the list consisting of $C_1$-$C_6$ alkyloxy, hydrogen, hydroxide, or $C_1$-$C_6$ alkyl groups.

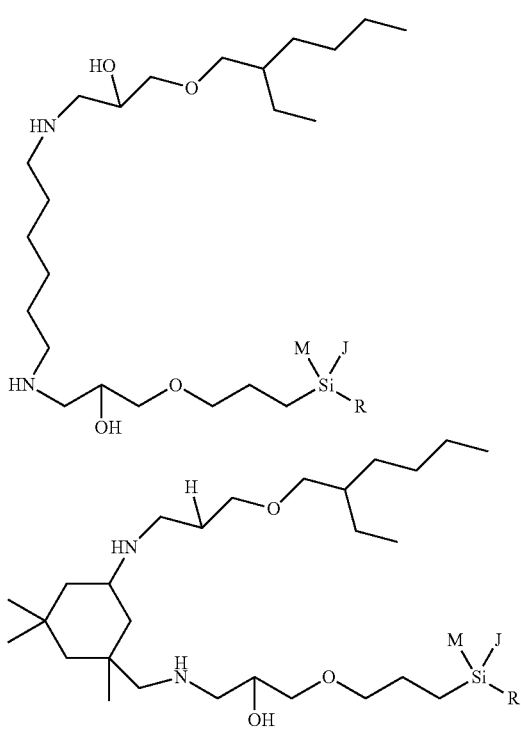

In at least one embodiment, a method for reducing siliceous scale in a Bayer process comprises the step of adding to a Bayer liquor a scale inhibiting amount of a composition of matter, the composition comprising a reaction product made from reacting:
an amine-containing small molecule having at least one —Si(OR)$_n$ per molecule, where n=1, 2, or 3, and R=H, C1-C12 alkyl, aryl, Na, K, Li, or NH$_4$, and
an amine-reactive hydrophobic molecule with a molecular weight of less than 500 daltons. The amine-containing small molecule can be any one or a combination of the following molecules:
aminoethylaminopropyltrialkoxysilane,
aminoethylaminopropyldialkoxysilane, and
aminoethylaminopropylmonoalkoxysilane. The amine-reactive hydrophobic small molecule can be selected from a group consisting of $C_3$-$C_{22}$ glycidyl ether, $C_3$-$C_{22}$ isocyanate, $C_3$-$C_{22}$ chloride, $C_3$-$C_{22}$ bromide, $C_3$-$C_{22}$ iodide, $C_3$-$C_{22}$ sulfate ester, $C_3$-$C_{22}$ phenolglycidyl ether, and any combination thereof.

These silane-based small molecules reduce the amount of DSP scale formed and thereby prevents its accumulation on Bayer process equipment.

The effectiveness of these small molecules was unexpected as the prior art teaches that only high molecular weight polymers are effective. Polymer effectiveness was presumed to depend on their hydrophobic nature and their size. This was confirmed by the fact that cross-linked polymers are even more effective than single chain polymers. As a result it was assumed that small molecules only serve as building blocks for these polymers and are not effective in their own right. (WO 2008/045677 [0030]). Furthermore, the scientific literature states "small molecules containing" . . . "[an] Si—O$_3$ grouping are not effective in preventing sodalite scaling" . . . because . . . "[t]he bulky group" . . . "is essential [in] keeping the molecule from being incorporated into the growing sodalite." Page 57 ¶ 9 *Light Metals* 2008, (2008). However it has recently been discovered that in fact, as further explained in the provided examples, small molecules such as those described herein are actually effective at reducing DSP scale.

It is believed that there are at least three advantages to using a small molecule-based inhibitor as opposed to a polymeric inhibitor with multiple repeating units of silane and hydrophobes. A first advantage is that the smaller molecular weight of the product means that there are a larger number of active, inhibiting moieties available around the DSP seed crystal sites at the DSP formation stage. A second advantage is that the lower molecular weight allows for an increased rate of diffusion of the inhibitor, which in turn favors fast attachment of the inhibitor molecules onto DSP seed crystals. A third advantage is that the lower molecular weight avoids high product viscosity and so makes handling and injection into the Bayer process stream more convenient and effective.

EXAMPLES

The following examples are presented to describe embodiments and utilities of the invention and are not meant to limit the invention unless otherwise stated in the claims.

Example 1

Polypropylene bottles and a temperature controlled rotary water bath were used under isothermal conditions for batch desilication experiments. Synthetic spent Bayer liquor was prepared on the same day or one day prior to the experiment. Typical analysis for the synthetic liquor used was:
Alumina (A): 84.62 g/L as $Al_2O_3$;
Caustic (C): 238.42 g/L as $Na_2CO_3$;
Ratio of A to C, 0.355.

A series of tests were conducted by adding the specified dose of TG14 and DG12 to the bottles containing synthetic spent Bayer liquor (150-200 mL). The synthetic liquor was heated in the water bath and as the desired temperature (95° C.) was reached, sodium metasilicate solution was added. (A calculated amount to give the starting $SiO_2$ concentration of 0.05M was added.) The resulting solutions were heated and held at 95° C. for the duration of the test (4 hours). Final solutions were filtered through a 0.45 µm membrane to collect solids, which were washed with hot de-ionized water and air-dried. Table 1 shows the percent of DSP mass precipitated relative to an unclosed control test.

TABLE 1

Percent DSP Mass precipitated in tests versus undosed control sample mass.

| Products | Dosage, ppm | % DSP Mass Precipitated vs. Control |
|---|---|---|
| Control | 0 | 100 |
| TG14 | 200 | 34 |
| DG12 | 200 | 69 |

The results showed that TG14 and DG12 reduce the mass of the resulting precipitate indicating inhibition of DSP formation.

Example 2

A series of further tests were conducted in a similar manner to that described in example 1 using Bayer process liquor from two operational refineries. In these and subsequent examples the following method was employed:

To a series of polypropylene bottles containing plant spent liquor (200 mL each), a 20 mL sample of 117 g/L $Na_2SiO_3 \cdot 5H_2O$ solution was added (3.0 g/L as $SiO_2$). To selected bottles, a specified dose of individual inhibitor product was also added. Duplicate bottles for each dose of each inhibitor were used, together with duplicate undosed control samples in each test. The resulting liquor mixtures were heated in a rotating water bath with temperature held constantly at 95° C. throughout the duration of the test (4 hours) so as to induce precipitation of DSP. After 4 hours, the contents of each bottle were individually filtered to collect the solids, which were washed with hot de-ionized water and dried at room temperature overnight. The effectiveness of the additives was determined by comparing the mass of the solid obtained from samples where an inhibitor was added, to that of the unclosed control samples (without additives).

Tables 2 displays the results of individual tests using inhibitor molecules produced by the reaction of a small molecule amine with the amine-reactive silane, 3-glycidoxypropyltrialkoxysilane (GPS). Inhibition results are displayed as the mass of DSP precipitated from treated samples as a percentage of the mass of DSP precipitated from untreated control samples. Average values of duplicate samples for all treatments were used to calculate the percent precipitated. The individual amines used to produce the various reagents and the nomenclature used to identify the amines is as follows:

A=Isophoronediamine
T=C,C,C-trimethylhexanediamine
S=Soyamine
O=Oleylamine

The ratio denoted in table 2 indicates the molar ratio of amine to GPS (as amine:GPS) used in the reaction to produce the active small molecule products. Variation of the molar ratio was observed to result in products displaying a variety of inhibitory properties.

TABLE 2

Inhibition of DSP by small molecule adducts of amine/silane reaction.

| Amine | Amine-Active Silane | Hydrophobe | Ratio | Product Dose (ppm) | % DSP Precipitated vs Undosed control |
|---|---|---|---|---|---|
| A | GPS | — | 1:4 | 25 | 86 |
| T | GPS | — | 1:4 | 50 | 95 |
| S | GPS | — | 1:2 | 40 | 72 |
| O | GPS | — | 1:2 | 40 | 73 |

In all cases the addition of the reaction product of the amine and GPS is shown to result in a lower mass of DSP precipitated than the mass of untreated samples. This indicates inhibition of the precipitation of DSP when such reagents are added to the Bayer liquor.

Example 3

Similar tests were conducted to assess the effect of reagents comprising the reaction products of 1) a small molecule amine, 2) an amine reactive silane and 3) an amine reactive hydrophobe. The method used was the same as that described in example 2 and reagents used to produce the active components are listed in table 3 together with the activity as measured by percent of DSP precipitated compared to an undosed control sample.

Again, in all cases the precipitation of DSP is reduced by addition of the reaction products as specified, indicating that inhibition of DSP precipitation is achieved by application of the relevant small molecules to the Bayer liquor.

Nomenclature used in Table 3 is the same as that used for Table 2 with the addition of:
ED=N-[3-(Trimethoxysilyl)propyl]ethylenediamine
P=4-nonylphenolglycidyl ether
E=2-Ethylhexylglycidyl ether
H=1,6-Hexanediamine

TABLE 3

Inhibition of DSP by small molecule adducts of amine/silane/hydrophobe reaction.

| Amine | Amine-Active Silane | Hydrophobe | Ratio | Product Dose (ppm) | % DSP Precipitated vs Undosed control |
|---|---|---|---|---|---|
| A | GPS | P | 1:3:1 | 40 | 75 |
| A | GPS | E | 1:2:2 | 40 | 96 |
| A | GPS | E | 1:2:1 | 40 | 63 |
| A | GPS | E | 1:1:1 | 50 | 18 |
| A | GPS | E | 1:1:1 | 20 | 67 |
| ED | — | E | 1:0:1 | 80 | 44 |
| A | GPS | E | 1:1:0.5 | 20 | 57 |
| T | GPS | E | 1:1:1 | 6 | 2 |
| H | GPS | E | 1:1:0.3 | 9 | 7 |

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the reduction of aluminosilicate containing scale in a Bayer process comprising:
   adding to a Bayer process stream an aluminosilicate scale inhibiting amount of a non-polymeric molecule having at least one $Si(OR)_n$ group wherein R is selected from the group consisting of $C_1$-$C_{12}$ alkyl, H, aryl, Na, K, Li, or $NH_4$, and wherein n=1, 2, or 3.

2. A method for the reduction of aluminosilicate containing scale in a Bayer process comprising:
   adding to a Bayer process stream an aluminosilicate scale inhibiting amount of a non-polymeric molecule, wherein the non-polymeric molecule is according to the formula:

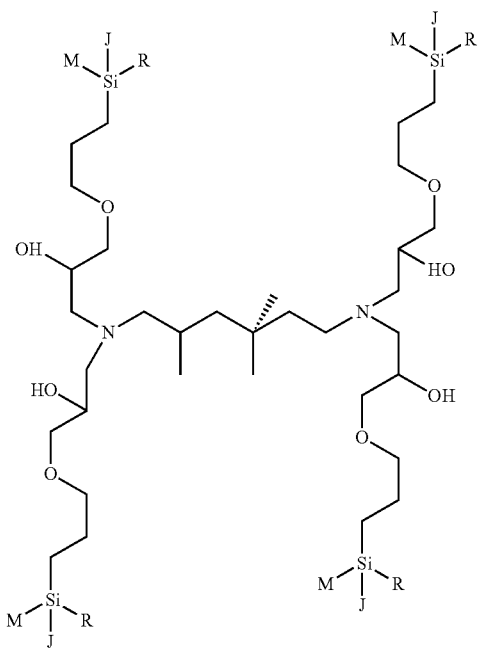

wherein M, J, and R groups are each selected from the group consisting of $C_1$-$C_6$ alkyloxy and hydroxide groups.

3. A method for the reduction of aluminosilicate containing scale in a Bayer process comprising:
   adding to a Bayer process stream an aluminosilicate scale inhibiting amount of a non-polymeric molecule, wherein the non-polymeric molecule is according to the formula:

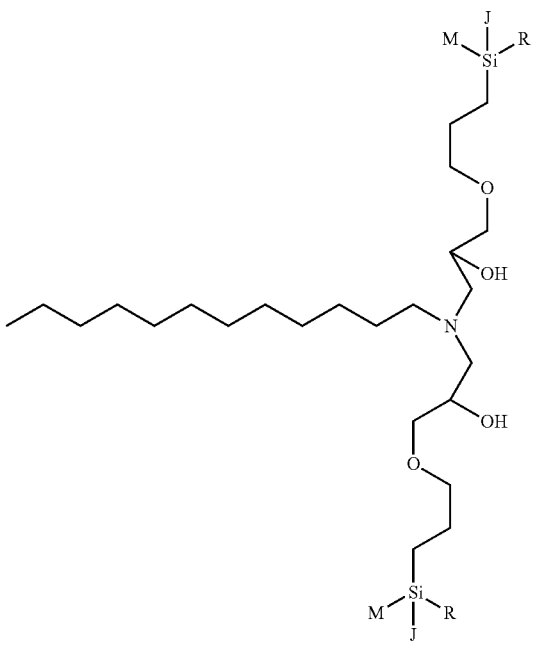

wherein M, J, and R groups are each selected from the group consisting of $C_1$-$C_6$ alkyloxy and hydroxide groups.

4. The method of claim 1, wherein the non-polymeric molecule further comprises at least one amine group.

5. The method of claim 1, wherein the at least one $Si(OR)_n$ group is selected from the group consisting of monoalkyloxy silane, dialkyloxy silane, trialkyloxy silane, and trihydroxy silane.

6. The method of claim 2, wherein the M, J, and R groups are each the same $C_1$-$C_6$ alkyloxy group.

7. The method of claim 2, wherein the M, J, and R groups are each hydroxyl groups.

8. The method of claim 3, wherein the M, J, and R groups are each $C_1$-$C_6$ alkyloxy groups.

9. The method of claim 3, wherein the M, J, and R groups are each the same $C_1$-$C_6$ alkyloxy group.

10. The method of claim 3, wherein the M, J, and R groups are each hydroxyl groups.

* * * * *